(12) United States Patent
Britton et al.

(10) Patent No.: US 9,206,324 B2
(45) Date of Patent: Dec. 8, 2015

(54) THICK FILM SEMICONDUCTING INKS

(75) Inventors: David Thomas Britton, Cape Town (ZA); Ekundare Ayodele Odo, Mowbray (ZA); Margit Harting, Mowbray (ZA)

(73) Assignee: PST SENSORS (PROPIETARY) LIMITED, Cape Town (ZA)

( * ) Notice: Subject to any disclaimer, the term of this patent is extended or adjusted under 35 U.S.C. 154(b) by 1908 days.

(21) Appl. No.: 12/158,837

(22) PCT Filed: Dec. 18, 2006

(86) PCT No.: PCT/IB2006/003666
§ 371 (c)(1),
(2), (4) Date: Aug. 5, 2008

(87) PCT Pub. No.: WO2007/072162
PCT Pub. Date: Jun. 28, 2007

(65) Prior Publication Data
US 2009/0004832 A1    Jan. 1, 2009

(30) Foreign Application Priority Data
Dec. 22, 2005   (ZA) .................. 2005/10436

(51) Int. Cl.
*H01L 21/20* (2006.01)
*C09D 11/08* (2006.01)
*C09D 5/24* (2006.01)
*C09D 11/52* (2014.01)
*C09D 191/00* (2006.01)
*C09D 191/02* (2006.01)

(52) U.S. Cl.
CPC *C09D 11/08* (2013.01); *C09D 5/24* (2013.01); *C09D 11/52* (2013.01); *C09D 191/005* (2013.01); *C09D 191/02* (2013.01)

(58) Field of Classification Search
USPC .................... 524/599, 600, 556, 361; 438/479
See application file for complete search history.

(56) References Cited

U.S. PATENT DOCUMENTS

| 2,014,760 | A |   | 9/1935 | Dewsbury at al. |
| 3,015,632 | A |   | 1/1962 | Remer et al. |
| 3,947,278 | A | * | 3/1976 | Youtsey ..................... 106/31.68 |
| 3,989,644 | A |   | 11/1976 | Bolon et al. |
| 3,992,212 | A |   | 11/1976 | Youtsey et al. |
| 4,373,964 | A | * | 2/1983 | Linden et al. ................. 106/505 |
| 2006/0062902 | A1 | * | 3/2006 | Sager et al. ..................... 427/74 |

FOREIGN PATENT DOCUMENTS

| EP | 0 285 359 A2 | 10/1988 |
| EP | 0319 953 A2 | 6/1989 |
| EP | 1 104 791 A1 | 11/1999 |
| EP | 1104791 * | 12/1999 |
| JP | 62262025 | 4/1989 |
| JP | 08194790 | 7/1996 |
| JP | 2003 036520 | 2/2004 |
| JP | 2004244525 | 9/2004 |

* cited by examiner

*Primary Examiner* — Monique Peets
(74) *Attorney, Agent, or Firm* — Kilpatrick Townsend & Stockton LLP

(57) ABSTRACT

A method of producing a printable composition comprises mixing a quantity of particulate semiconductor material with a quantity of a binder. The semiconductor material is typically nanoparticulate silicon with a particle size in the range from 5 nanometers to 10 microns. The binder is a self-polymerizing material comprising a natural oil, or a derivative or synthetic analog thereof. Preferably the binder comprises a natural polymer formed by auto-polymerization of a precursor consisting of a natural oil, or its derivatives including pure unsaturated fatty acids, mono- and di-glycerides, or methyl and ethyl esters of the corresponding fatty acids. The method may include applying the printable composition to a substrate, in single or multiple layers, and allowing the printable composition to cure to define the component or conductor on the substrate.

15 Claims, 3 Drawing Sheets

THICK FILM SEMICONDUCTING INKS

CROSS-REFERENCE TO RELATED APPLICATIONS

The present application is a U.S. National Phase application of PCT/IB2006/003666, filed Dec. 18, 2006, which claims priority to South African patent application 2005/10436, filed Dec. 22, 2005. The entire contents of each of these applications are hereby incorporated by reference in their entirety.

BACKGROUND OF THE INVENTION

THIS invention relates to printable compositions for use in electronic and electrical applications in general, and specifically in those applications where semiconducting properties are required.

Semiconductor nanoparticles, with a characteristic size of a few nanometers up to several hundred nanometers, are a widely studied type of material, in which size effects dominate over properties of the bulk material. In general, depending on the specific material and its application, three different size-related phenomena may change the electronic, optical, thermal and mechanical properties of such nanoparticles:
  1. a different structure and composition compared to the known bulk phases;
  2. the higher surface to volume ratio of the particles compared to the bulk phase, which causes surface states and processes to dominate; and
  3. quantum confinement effects when the size of the object is similar to or smaller than the wavelength and coherence length of a fundamental excitation (electronic state, optical wavelength or phonon excitation).

Various semiconductor inks using such particles have been disclosed. For example, organic semiconducting inks comprising semiconducting particles dispersed randomly in a matrix or binder, and inorganic semiconducting inks in which the semiconducting particles form an interconnecting structure, are known.

In such applications, the binder or matrix material is often a polymer which is soluble in an easily obtainable solvent, such as acetone, chloroform or toluene. Common examples are polystyrene and cellulose acetate butyrate (CAB), which are insulators, and polythiophenes which are conjugated hole conductors, allowing charge transport between isolated particles.

It is an object of the invention to provide alternative printable compositions comprising semiconductor particles.

SUMMARY OF THE INVENTION

According to the invention there is provided a method of producing a printable composition comprising mixing a quantity of particulate semiconductor material with a quantity of a binder, wherein the binder is a self-polymerising material comprising a natural oil, or a derivative or synthetic analogue thereof.

The binder may comprise a natural polymer formed by auto-polymerisation of a precursor consisting of a natural oil, or its derivatives including pure unsaturated fatty acids, mono- and di-glycerides, or methyl and ethyl esters of the corresponding fatty acids.

The binder may comprise a drying or semi-drying oil, or a mixture thereof.

The drying oil may contain one or more octadecanoic acids, octadecadienoic acids, and/or octadecatrienoic acids.

Preferably, the drying oil is linseed or tung oil.

In the case of a semidrying oil, the oil may be soy-bean, cottonseed or castor oil, for example.

The binder may be an octadecadienoic acid or an octadecatrienoic acid, or a mixture thereof.

For example, the binder may be linolenic acid or linoleic acid.

The method may include mixing the binder with a solvent, such as ethanol, acetone or lacquer thinners.

The composition may be applied to the substrate as a lacquer, comprising the binder and the particles, or may be applied as a varnish, comprising the binder, the particles, and a solvent.

Preferably, the volume ratio of the particulate semiconductor material to the binder is greater than 50%, and more preferably greater than 80%.

The particulate semiconductor material may have a particle size in the range from 5 nanometers to 10 microns, and preferably in the range from 50 to 500 nanometers.

In a typical example, the size range may be from 100 to 300 nanometers.

In a preferred embodiment of the method, the particulate semiconductor material comprises silicon.

Further according to the invention there is provided a method of producing an electronic component or conductor comprising preparing a printable composition as defined above, applying the printable composition to a substrate, and allowing the printable composition to cure to define the component or conductor on the substrate.

The printable composition may be applied in a single application or in multiple layers to define electronic components with desired characteristics.

Preferably, the printable composition is allowed to cure under ambient conditions.

The substrate may be rigid or flexible, and may comprise, for example, metal, glass, plastics, and paper.

The printable composition may be applied in a layer having a thickness in the range from 0.1 to 500 microns.

Typically, the layer has a thickness in the region of 100 microns.

The invention extends to a printable composition, and to an electronic component or conductor, produced by the respective method.

DESCRIPTION OF EMBODIMENTS

The present invention concerns printable compositions for use in electronic and electrical applications in general, and specifically in those applications where semiconducting properties are required. These compositions, which can be used in the production of electronic circuits, components and as composite materials for the production of semiconducting materials and layers, comprise particles with a semiconducting functionality and a self-polymerising binder, preferably of natural origin, which cures through oxidation or hydroxation induced auto-polymerisation.

For purposes of this document, any such printable composition, generally known as an ink, lacquer, paint, varnish, suspension or the like is referred to as an "ink". Methods of applying the ink, including spraying, casting and painting, as well as conventional intaglio, flat or relief printing techniques, are generally referred to as "printing". Dry transfer methods such as xerography and thermal printing may be included if the melting point and viscosity of the binder are such that it is solid under normal conditions. The above types of printable composition and methods of application thereof are given by way of example and other examples may occur to those skilled in the art.

As stated above, semiconductor inks are known in which the binder or matrix material is a polymer such as polystyrene or cellulose acetate butyrate (CAB), which is soluble in an easily obtainable solvent, such as acetone, chloroform or toluene.

On the other hand, binder-particle mixtures are well known in the traditional crafts as inks, lacquers and varnishes, in which inorganic particles serve as a pigment. Traditionally in a paint or lacquer, the pigment is mixed with a natural drying oil which polymerises through auto-oxidation, although more recently synthetic monomers have been applied, which may also polymerise through hydroxation. In a varnish, or ink, the binder is thinned with a suitable organic solvent, such as ethanol or methanol, or mixture of solvents, such as commercial lacquer thinners. The addition of a thinner serves the dual purpose of adjusting the rheology of the liquid and preventing premature hardening, thus prolonging storage times. The natural origin and limited processing of these binder materials leads them to be considered as ecologically friendly renewable resources.

Neither traditional drying oils, nor their derivatives, have been previously considered as binders in functional inks, such as those used for passive or active thick film electronic components, circuits, or layers. However, synthetic esters, with similar self-polymerising properties, are used commercially in both passive electronics and coating applications. Most of these are proprietary, but they generally consist of either a methyl ester or cyclic ester with aromatic side chains.

Figure 1A:
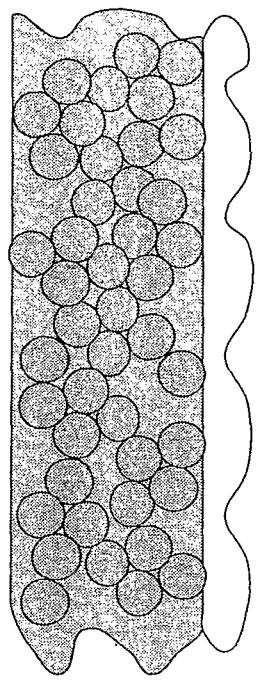
FIG. 1(a) is a schematic sectional diagram illustrating dispersed semiconductor particles in a binder layer deposited on a substrate, according to a first embodiment of the invention.

For the production of inks having photoelectronic and optoelectronic properties according to the invention, the semiconductor particles need to be uniformly dispersed in the binder material as shown schematically in FIG. 1(a). To achieve this the interfacial tension between the two materials needs to be low, to allow complete wetting of the particles. The viscosity of the ink should be kept high during deposition and curing to prevent sedimentation or flocculation of the particles.

Figure 1B:
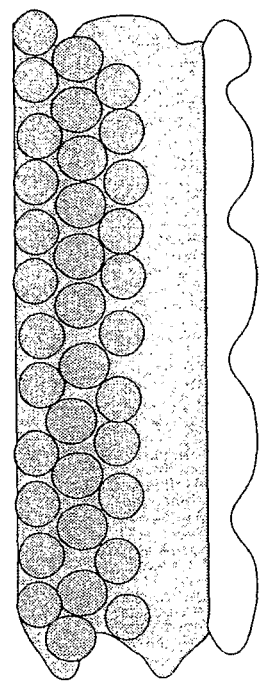
FIG. 1(b) is a schematic sectional diagram similar to that of FIG. 1(a) illustrating an interconnecting network of semiconductor particles in a binder layer deposited on a substrate, according to a second embodiment of the invention.
Figure 1C:
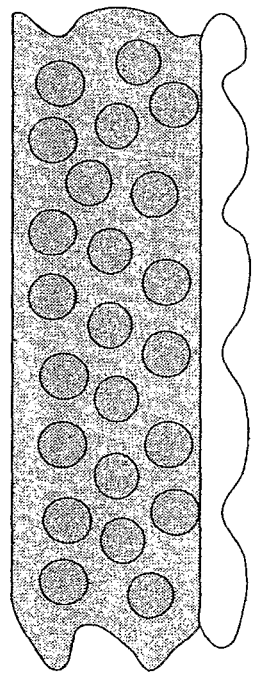
FIG. 1(c) is a schematic sectional diagram similar to that of FIGS. 1(a) and 1(b) illustrating semiconductor particles concentrated in the lower part of a binder layer deposited on a substrate, according to a third embodiment of the invention.
Figure 1D:
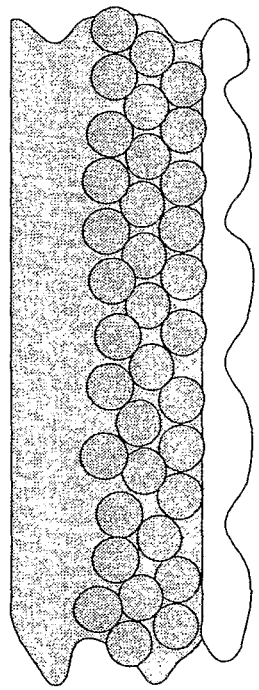
FIG. 1(d) is a schematic sectional diagram similar to that of FIGS. 1(a) to (c) illustrating semiconductor particles concentrated in the upper part of a binder layer deposited on a substrate, according to a fourth embodiment of the invention.

For printing of a semiconducting layer or component, the ink should contain a high volume fraction of the semiconducting particles relative to the binder material, so that the final material contains an interconnecting network of particles, as shown schematically in FIG. 1(b), which may have a regular or fractal geometry. The ink may, however, for application or storage, be diluted with any quantity of solvent or thinner, including water or a non-reactive organic liquid. The interfacial tension between the particles and the binder is therefore of little significance, although a higher value may help prevent complete wetting of the interstices between the particles, thus promoting a better conducting path between adjacent particles. In many cases, separation through settling or flocculation, as shown schematically in FIGS. 1(c) and 1(d), respectively, may be beneficial in the production of bilayer systems and components consisting of semiconducting and insulating layers, such as MIS-FETs and capacitors. The printed layers or components will typically have a thickness in the range from 0.1 to 500 microns.

Figure 2:
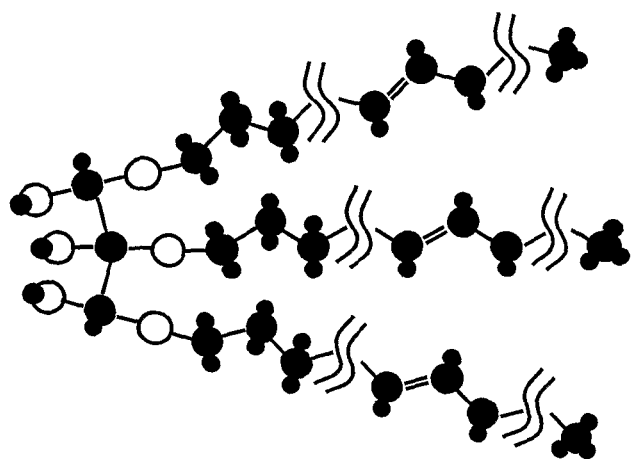
FIG. 2 is a schematic diagram of a natural oil suitable for use in the method of the invention.

The binder material should be a natural polymer formed by auto-polymerisation of a precursor consisting of a natural oil, or its derivatives including pure unsaturated fatty acids, mono- and di-glycerides, as well as methyl and ethyl esters of the corresponding fatty acids. Natural oils are generally a complex mixture of triglycerides, with three randomly selected fatty acids attached to a glycerol (propan-1-2-3-triol) backbone, as shown in FIG. 2. Their composition, therefore, depends strongly on both the plant species and its cultivation, but through blending a consistent quality with regard to curing properties and fatty acid fractions is usually obtained.

Generally, the volume ratio of the particulate semiconductor material to the binder should greater than 50%, and more preferably greater than 80%. In two of the examples below, a volume ratio of the order of 90% was used. The particulate semiconductor material may have a particle size in the range from 5 nanometers to 10 microns, and is preferably nanoparticulate, with a size in the range from 50 to 500 nanometers.

The predominant components of drying oils responsible for polymerisation are the octadecanoic acids, characterised by one double bond, the octadecadienoic acids, with two double bonds, and the octadecatrienoic acids (three double bonds). Other unsaturated fatty acids also contribute to the polymerisation, with the non-polymerised saturated fatty acids acting as plasticisers.

Most common octadecatrienoic acids are all conjugated trans-fatty acids, with alternating double and single bonds, and polymerise the most effectively. The exception is linolenic acid (9cis-12cis-15cis-octadecatrienoic acid), which is a non-conjugated cis-fatty acid and is the major component of linseed oil. Besides linseed oil, the main drying oil used in coatings is tung oil, also known as china wood oil, whose main polymerising component is eleostearic acid (9cis-11trans-13trans-octadecatrienoic acid). Both of these oils have the advantage of being inexpensive and readily available compared to both synthetic binders and other natural oils.

Examples of other sources of oils rich in octadecatrienoic acids, suitable as binder precursors, are listed in Table 1 below.

TABLE 1 examples of plant oils with significant concentrations of octadecatrienoic acids suitable as self-polymerising binders for semiconductor composite materials.

| Oil | Main fatty acid component |
|---|---|
| Linseed | linolenic (9cis-12cis-15cis-octadecatrienoic) |
| tung | eleostearic (9cis-11trans-13trans-octadecatrienoic) |
| *calendula* (true or pot marigold) | calendic (8trans-10trans-12cis-octadecatrienoic) |
| *Jacaranda* | jacaric (8cis-10trans-12cis-octadecatrienoic) |
| pomegranate, gourd | punicic (9cis-11trans-13cis-octadecatrienoic) |
| *Catalpa* | catalpic (9trans-11trans-13cis-octadecatrienoic) |

For some applications, for example where a graded interface is required, semidrying oils such as soy-bean, cottonseed and castor oil, may be used to supplement, or even replace the drying oils. The major active components of these oils are linoleic (9cis-12cis-octadecadienoic) acid and ricolenic (12-hydroxy-9-octadecanoic) acid.

Oil-based semiconducting inks are particularly well suited to offset lithography and other flat printing processes, because of their intrinsic hydrophobicity. There is already a significant body of common knowledge in the use and handling of traditional oil-based paints and inks, and they can just as easily be applied to relief, intaglio or stencil processes. In addition, the oils are soluble in most easily available non-aggressive solvents, such as ethanol or acetone, allowing simple and safe modification of their viscosity and cleaning.

For increased viscosity and a shorter curing time, methods already applied to traditional media, such as heat treatment to partially polymerise oil before mixing the ink, can be applied. A simple example of this would be to used boiled linseed oil, instead of raw linseed oil, in the ink formulation. However, if siccatives or accelerators are used, their effect on the electronic properties of the resulting material must be taken into account. Most drying agents are metallic salts of organic acids, and contain ionic groups which can affect the doping level of semiconducting particles, and may also lead to electrical conductivity in otherwise insulating layers.

The pure fatty acids, particularly the octadecatrienoic acids, are polar molecules which are water soluble, making them suitable for water-based compositions for relief and intaglio printing processes. Without the other components found in the oil, they will form a denser, less flexible polymer, and will cure much more rapidly. In addition to the acids listed in Table 1, dienoic acids, such as linoleic (9cis-12cis-octadecadienoic) acid, which is the most common unsaturated fatty acid found in almost all plants, will polymerise to form suitable binders. Like the oils, the pure acids are non-aggressive and soluble in mild solvents like alcohols and ethers which do not attack common materials (e.g. synthetic and natural rubbers, plastics) used in printing processes.

Analogues of the oils, which can also be used as self-polymerising binders for semiconducting inks, include the mono- and di-glycerides and the methyl and ethyl esters of the unsaturated fatty acids. These are effectively intermediate forms, in which systematic removal of saturated acids, while keeping the molecules non-polar, allows the rapid polymerisation associated with pure acids and the hydrophobic properties of the oils.

Substrates on which the printable compositions can be deposited may be rigid or flexible, according to requirements. Possible rigid substrates include glass, metals and stiff or rigid plastics. Flexible substrates can be, for example, flexible plastics, thin metallic layers or paper.

Example 1

The first example concerns the production of semiconducting inks composed of nanoparticulate silicon with raw linseed oil as a self-polymerising binder. The silicon nanoparticles were produced by mechanical attrition, for 3 hours in an orbital pulveriser, of bulk silicon. Both single crystalline wafers, boron-doped P type and antimony-doped N type, and metallurgical grade silicon were used. Typical particle sizes were between 100 and 300 nm. Inks were produced by first diluting the oil with ethanol as a carrier solvent, and then dispersing the nanopowders at a high volume ratio, in excess of 90%, relative to the oil. Layers, typically 100 microns thick, were then printed onto paper substrates. Electrical connections for Hall effect measurements were then applied using printable silver conductor screen printing ink (Du Pont 5000). The majority carrier mobilities and concentrations, as determined by the Hall effect, are given in Table 2 below.

TABLE 2

Semiconducting characteristics of inks produced from various silicon nanoparticles, using raw linseed oil as a self-polymerising binder and ethanol as a solvent.

| Nanopowder | Particle Vol. Fraction | resistivity $M\Omega$ cm | Mobility $cm^2 V^{-1} s^{-1}$ | Carrier conc $\times 10^{12}$ $cm^{-3}$ |
|---|---|---|---|---|
| n-type Si | 88% | 0.26 | 1.6 | 14.9 |
| n-type Si | 90% | 0.29 | 1.9 | 11.1 |
| n-type Si | 92% | 0.32 | 1.2 | 17 |
| p-type Si | 88% | 13 | 0.12 | 0.86 |
| p-type Si | 90% | 15.5 | 0.15 | 0.28 |
| p-type Si | 92% | 16.2 | 0.45 | 0.41 |
| nm metallurgical Si | 91% | 2.22 | 0.65 | 4.3 |

Example 2

The second example concerns the production of semiconducting inks made with different natural oils as self-polymerising binders and metallurgical grade silicon nanoparticles. The silicon nanoparticles were produced by mechanical attrition of the bulk material for 180 minutes in an orbital pulveriser. Inks were produced by mixing 20 microliters of oil with 0.5 g silicon powder, and thinning with 50 microliters of commercial laquer thinners, to achieve complete wetting. The mixture was then agitated for 40 minutes in an ultrasonic bath to achieve a homogeneous dispersion of the silicon powder. The following oils were compared: linseed oil; castor oil; soy bean oil; calendula oil; and a blend of calendula with non-drying oils.

Figure 3:
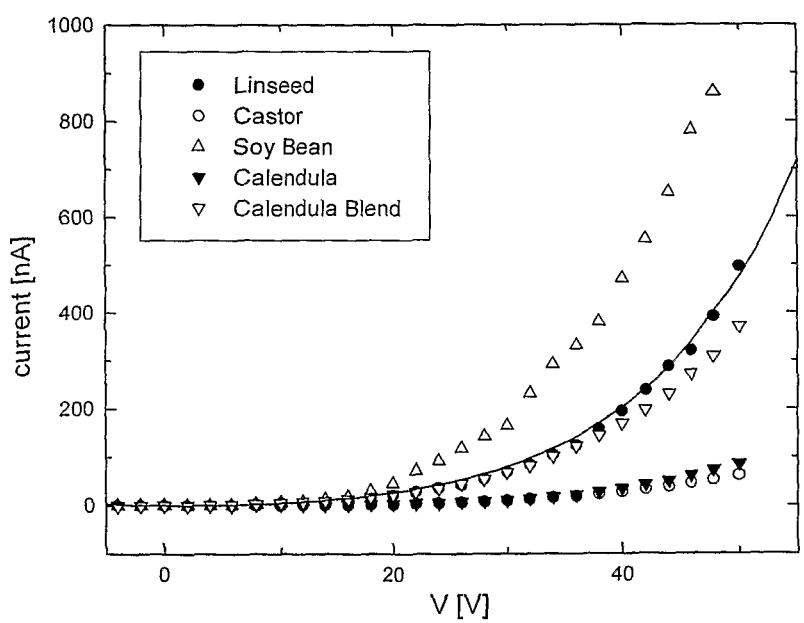
FIG. 3 is a graph illustrating characteristic curves of Schottky diodes manufactured according to the method of the invention, using different binder materials.

For the investigation of the electrical characteristics of the inks, a 10 mm by 1 mm silver strip was cast onto a glass substrate. After drying overnight, a channel of width 0.5 mm was scribed perpendicular to the length, forming the two electrical contacts. The ink was drop cast into the channel to form a symmetric Schottky diode structure. No attempt was made to control the size or spread of the ink drop. Although several compositions cured almost immediately, all diodes were left to cure for three days under ambient conditions. The positive half of the Schottky diode curve is shown in FIG. 3 for exemplary structures using the different oils.

With the exception of a scaling factor, resulting from a different reverse saturation current, the curves shown in FIG.

3 are qualitatively the same. They can be modelled, as shown by the solid curve, using the same contact potential difference and ideality factor. This indicates that only the semiconducting silicon particles, and not the binder materials, contribute directly to the semiconducting properties of the inks.

Example 3

A third example concerns the use of the fatty acids, linolenic (9cis-12cis-15-cis-octadecatrienoic) acid and linoleic (9cis-12cis-octadecadienoic) acid, in semiconducting inks. For easy comparison of the binder properties, standardised test structures and ink compositions were used.

To construct the test structure, a silver gate contact was first printed, using Du Pont 5000 silver conductor screen printing ink, onto a 350 gsm Euro Art glossy paper substrate by tampon printing. The size of this electrode was 1 mm by 3 mm. Over this, an insulating layer was tampon printed, using Du Pont 8153 insulator. Finally, the source and drain electrodes, also Du Pont 5000 silver conductor, were overprinted using the same method. The gate length and width in the final structure were 120 µm and 1 mm respectively.

In line with the manufacturer's recommendations for the thick film inks, the structures were dried in an oven at 120° C. for 30 minutes after printing the insulator, and after printing the final silver contacts. The electrical characteristics of the device structure, without application of the semiconducting layer, were also determined.

Two different silicon powders were used in the formulation of the inks: 2503 metallurgical grade silicon, from Silicon Smelters (Pty) Ltd, Polokwane, South Africa, milled for three hours in an orbital pulveriser; and intrinsic silicon nanopowder, from MTI Crystal Corp, which had a specified particle size less than 50 nm. To fully characterise the influence of the binder, inks were produced with a volume fraction of silicon at the lower limit of 50%, comprising 0.4 g silicon powder added to a solution of 200 microliters of the respective binder in an appropriate volume of commercial lacquer thinners. To achieve complete wetting of the powder, and similar ink viscosities, the quantity of solvent was kept the same for each type of powder, namely 1.2 ml for the metallurgical grade silicon and 4.8 ml for the smaller intrinsic nanoparticles. After addition of the powder, the mixtures were sonicated in an ultrasonic bath for two hours. Approximately five microliters of each ink was either hand printed, or drop cast, onto the gate of a different pre-prepared structure, and allowed to dry overnight. The printed layers showed a high integrity, forming a continuous film without being powdery, whereas drop cast layers developed surface cracks during drying. All layers showed good adhesion to the substrate.

The characteristic curves of each structure were determined using a Keithley 4200 semiconductor characterisation system, for drain-source potentials up to 20V, and gate potentials of 0, ±5 V, ±10 V, and ±15 V. The geometry and dimensions of the test structure were such that saturation of the drain-source current could not be attained, and only a weak field effect was observed. All devices, therefore, exhibited a linear response, with an offset for applied gate potential indicating a finite gate-drain resistance.

Figure 4:
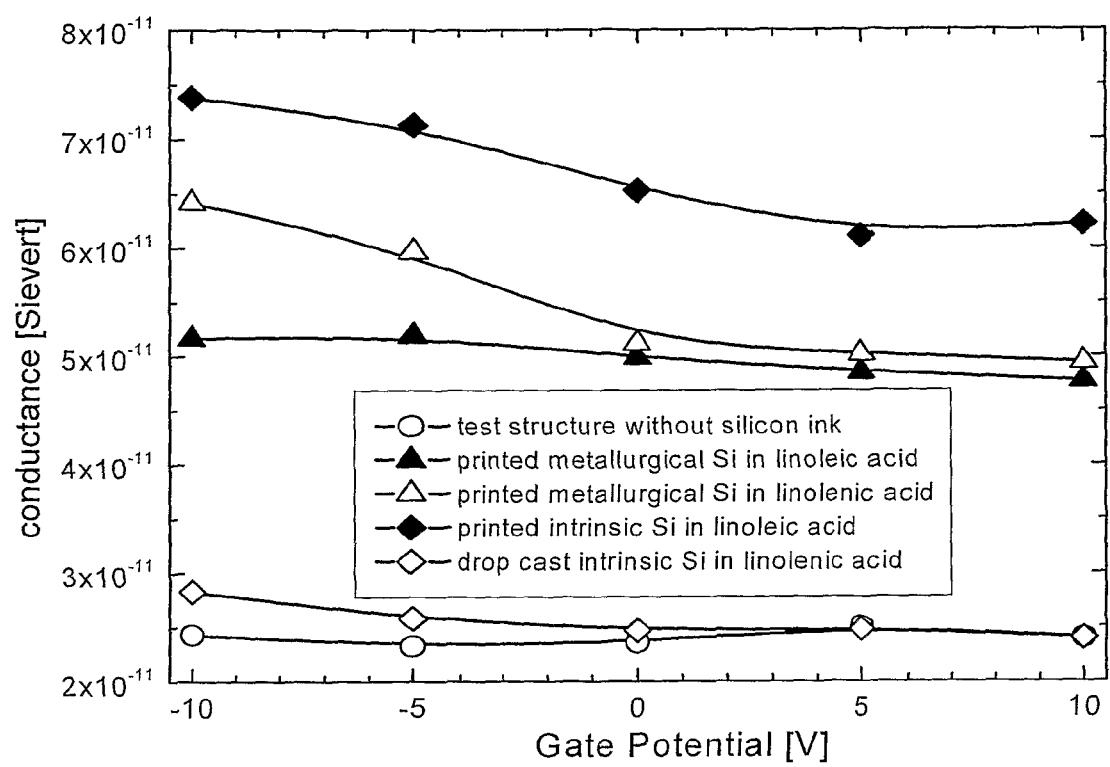
FIG. 4 is a graph illustrating the conductance of semiconducting layers, produced from silicon inks using linoleic and linolenic acid as binders, as a function of the applied gate potential in a transistor test structure.

The source-drain conductance for each device, after correction for the gate-drain current, is shown as a function of the applied gate potential in FIG. 4. As can be seen, the conductance is higher for the printed layers compared to the bare device structure, indicating that there is electrical connectivity between the particles, even with the high binder fractions used. Also, the conductance is dependent on the applied gate voltage, confirming that the printed layers are indeed semiconducting. These effects are much less pronounced for the drop cast layer shown, suggesting that connection between the particles, or the particles and electrical contacts, is inhibited by dispersion or phase separation of the particles.

The invention claimed is:

1. A method of producing a printable semiconducting ink, comprising mixing a quantity of silicon particles with a quantity of a binder, wherein the silicon particles have a particle size in the range of 5 nanometers to 10 microns and have a semiconducting functionality; wherein the binder is a self-polymerising material comprising a natural oil, or a derivative or synthetic analogue thereof; and wherein the volume ratio of the silicon particles to the binder is greater than 50%, to produce an ink with semiconducting properties.

2. The method according to claim 1 wherein the binder comprises a natural polymer formed by auto-polymerisation of a precursor consisting of a natural oil, or its derivatives including pure unsaturated fatty acids, mono- and di-glycerides, or methyl and ethyl esters of the corresponding fatty acids.

3. The method according to claim 2 wherein the binder comprises a drying or semi-drying oil, or a mixture of drying and semi-drying oils.

4. The method according to claim 3 wherein the oil is a drying oil containing one or more octadecanoic acids, octadecadienoic acids, and/or octadecatrienoic acids.

5. The method according to claim 4 wherein the drying oil is linseed or tung oil.

6. The method according to claim 3 wherein the oil is a semi-drying oil comprising soy-bean, cottonseed or castor oil.

7. The method according to claim 2 wherein the binder is an octadecadienoic acid or an octadecatrienoic acid, or a mixture thereof.

8. The method according to claim 7 wherein the binder is linolenic acid.

9. The method according to claim 7 wherein the binder is linoleic acid.

10. The method according to claim 1 including mixing the binder with a solvent.

11. The method according to claim 10 wherein the solvent comprises ethanol, acetone or lacquer thinners.

12. The method according to claim 1 wherein the volume ratio of the particulate semiconductor material to the binder is greater than 80%.

13. The method according to claim 1 wherein the particulate semiconductor material has a particle size in the range from 50 nanometers to 500 nanometers.

14. The method according to claim 13 wherein the particulate semiconductor material has a particle size in the range from 100 nanometers to 300 nanometers.

15. A semiconducting ink produced by the method of claim 1.

* * * * *

UNITED STATES PATENT AND TRADEMARK OFFICE
CERTIFICATE OF CORRECTION

| | |
|---|---|
| PATENT NO. | : 9,206,324 B2 |
| APPLICATION NO. | : 12/158837 |
| DATED | : December 8, 2015 |
| INVENTOR(S) | : David Thomas Britton, Ekundare Ayodele Odo and Margit Harting |

It is certified that error appears in the above-identified patent and that said Letters Patent is hereby corrected as shown below:

On the Title Page:

Item (73) Assignee: "PST SENSORS (PROPIETARY) LIMITED" should be corrected to read -- PST SENSORS (PROPRIETARY) LIMITED --

Signed and Sealed this
Twenty-second Day of March, 2016

Michelle K. Lee
*Director of the United States Patent and Trademark Office*